United States Patent
Chen et al.

(10) Patent No.: US 11,269,718 B1
(45) Date of Patent: Mar. 8, 2022

(54) ROOT CAUSE DETECTION AND CORRECTIVE ACTION DIAGNOSIS SYSTEM

(71) Applicant: Amazon Technologies, Inc., Seattle, WA (US)

(72) Inventors: Qijia Chen, Seattle, WA (US); Alexander Zimin, Berlin (DE); Nam Khanh Tran, Berlin (DE); Paul M. Vazquez, Berlin (DE); Laurent Callot, Berlin (DE); Meredith Paige Kiessling, Berlin (DE); Joel Dan Castellon Arevalo, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 16/915,993

(22) Filed: Jun. 29, 2020

(51) Int. Cl.
  G06F 11/07 (2006.01)
  G06F 11/34 (2006.01)
  G06F 9/54 (2006.01)
  G06F 11/30 (2006.01)

(52) U.S. Cl.
  CPC ......... G06F 11/0793 (2013.01); G06F 9/541 (2013.01); G06F 11/0709 (2013.01); G06F 11/079 (2013.01); G06F 11/0751 (2013.01); G06F 11/0772 (2013.01); G06F 11/3006 (2013.01); G06F 11/3495 (2013.01)

(58) Field of Classification Search
  CPC ............. G06F 11/0709; G06F 11/0751; G06F 11/0772; G06F 11/079; G06F 11/0793; G06F 11/3006; G06F 11/3495
  USPC ............................................. 714/15, 48, 57
  See application file for complete search history.

(56) References Cited

U.S. PATENT DOCUMENTS

| 8,583,779 | B2 | 11/2013 | Meir et al. |
| 2009/0321795 | A1 | 12/2009 | Iscen |
| 2013/0262656 | A1 | 10/2013 | Cao et al. |
| 2016/0328954 | A1 * | 11/2016 | Ramadoss .......... G05B 23/0278 |
| 2021/0081818 | A1 * | 3/2021 | Fahmy .................... G06F 16/24 |

FOREIGN PATENT DOCUMENTS

| CN | 110493348 A | * | 11/2019 | |
| DE | 102012110129 A1 | * | 4/2013 | ......... G05B 19/4184 |

OTHER PUBLICATIONS

U.S. Appl. No. 15/873,692, filed Jan. 17, 2018, Pranav Garg et al.
U.S. Appl. No. 16/788,100. filed Feb. 11, 202, Can Cui et al.

\* cited by examiner

*Primary Examiner* — Chae M Ko
(74) *Attorney, Agent, or Firm* — Robert C. Kowert; Kowert, Hood, Munyon, Rankin & Goetzel, P.C.

(57) ABSTRACT

Methods, systems, and computer-readable media for automatically detecting root causes of anomalies occurring in information technology (IT) systems are disclosed. In some embodiments, data of a service graph depicting dependencies between nodes or services of the IT infrastructure is traversed to determine propagation patterns of anomaly symptoms/alarms through the IT infrastructure. Also, a causal inference model is used to determine probabilities that an observed propagation pattern corresponds to a stored propagation pattern, wherein a close correspondence indicates that the current anomaly is likely caused by a similar root cause as a past anomaly that caused the stored propagation pattern.

20 Claims, 9 Drawing Sheets

ROOT CAUSE DETECTION AND CORRECTIVE ACTION DIAGNOSIS SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogs of items offered for sale. For each item offered for sale, such electronic catalogs typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to generate a product detail page or process an order placed by a consumer for one or more items in the catalog.

Figure 1:
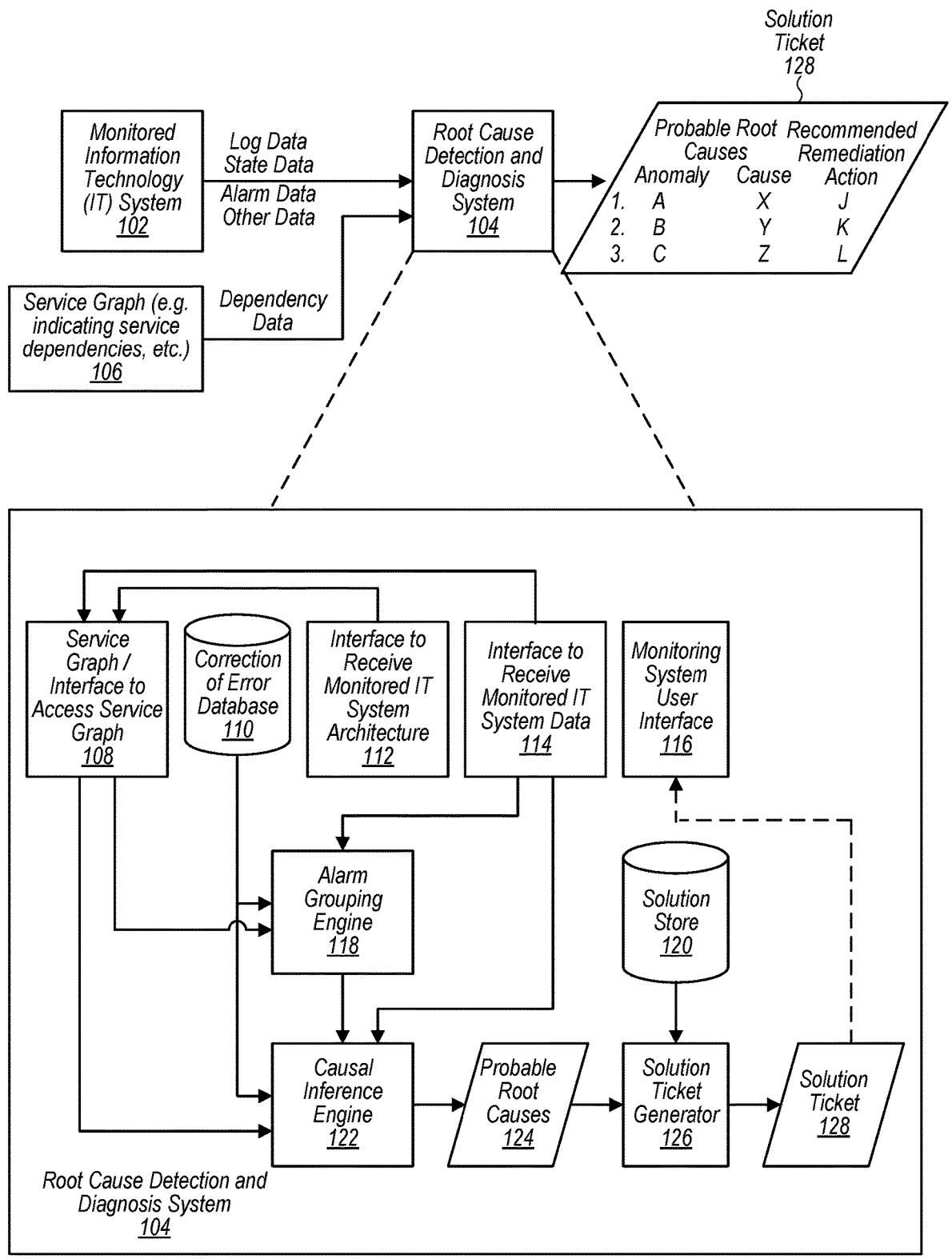
FIG. 1 illustrates an example system for performing root cause detection and diagnosis services for a monitored information technology system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for determining root causes of anomaly events occurring in an information technology (IT) system and diagnosing corrective actions for the root causes are described. Using the techniques described herein, root causes of anomaly events may be automatically determined and corrective action recommendations to resolve the anomaly events may be automatically generated. This may shorten durations of anomaly events by reducing an amount of time required to implement corrective actions. Also, a root cause detection and diagnosis system or service may free up organizational resources, such as engineers, technician, etc. to focus on higher value added tasks by reducing an amount of time required to be spent to resolve an anomaly event. Additionally, a root cause detection and diagnosis system or service may lead to increased reliability and performance by implementing consistent solutions to anomaly events.

In some embodiments, an information technology (IT) operations monitoring system includes computing devices configured to generate, or receive access to, a service graph for the IT operations, determine whether a quantity of active alarms for the IT operations exceeds one or more alarm thresholds, and provide an indication of one or more root cause conditions causing the active alarms in response to determining the number of active alarms exceeds the one or more alarm thresholds. The service graph includes a graphical representation of the IT operations indicating logical locations of network nodes of the IT operations relative to other network nodes of the IT operations and service dependencies between services implemented at respective ones of the nodes of the IT operations.

To determine the one or more root cause conditions, the one or more computing devices of the IT operations monitoring system are also configured to traverse service graph data corresponding to a plurality of moments in time during which respective ones of the active alarms were triggered, identify one or more alarm groupings for the active alarms based on logical locations of nodes associated with the active alarms as indicated in the service graph and based on service dependencies of services associated with the active alarms as indicated in the service graph, generate one or more probable root cause inferences based on applying the identified one or more alarm groupings to a causal analysis model, wherein the causal analysis model comprises alarm grouping patterns and associated probable root causes, and select, from the generated one or more probable root cause inferences, respective ones of the one or more probable root cause inferences that have associated probabilities greater than a probability threshold, wherein the selected one or more probable root cause inferences are assigned as the one or more root cause conditions causing the active alarms.

In some embodiments, a method includes determining a quantity of active alarms for a monitored system exceeds one or more alarm thresholds and traversing service graph data for the monitored system at a plurality of moments in time to identify one or more alarm patterns. The service graph includes logical locations of nodes of the monitored system relative to other nodes of the monitored system and service dependencies between services implemented at respective ones of the nodes of the monitored system. Furthermore, the method includes determining one or more root cause conditions causing the active alarms based on applying the identified one or more alarm patterns to a causal analysis model, wherein the causal analysis model comprises alarm patterns and associated root causes.

In some embodiments, one or more non-transitory computer-readable media store program instructions, that when executed on, or across, one or more processors, cause the one or more processors to determine a quantity of active alarms for a monitored system exceeds one or more alarm thresholds, traverse service graph data for the monitored system corresponding to a plurality of moments in time to identify one or more alarm patterns, wherein the service graph comprises, and determine one or more root cause conditions causing the active alarms based on applying the identified one or more alarm patterns to a causal analysis model, wherein the causal analysis model comprises alarm patterns and associated root causes.

As the scale, scope, and complexity of IT systems expand, traditional root cause detection techniques such as an engineer reviewing log files, service metrics, alarm histories, etc. to determine root causes are becoming unwieldy and overly time consuming. Also, such large and complex IT systems often include interconnected services, such that an anomaly in one node or service has a ripple effect such that other connected nodes and services are also affected by the anomaly. Thus, a single anomaly event in one service has the potential to trigger events and alarms in other services, such that an alarm storm is created. In an alarm storm, a large quantity of concurrently active alarms may further complicate efforts to identify a root cause of an anomaly event by hiding the actual root cause in a large volume of other alarms that have been triggered due to cascading effects of the anomaly on the IT system.

In some embodiments, a root cause detection and diagnosis system or service may use a service graph that defines dependencies between nodes and services of an IT system to group alarms based on dependencies, such that a quantity of alarms in an alarm storm is reduced and represented in a manageable format comprising a limited number of grouped alarms. The root cause detection and diagnosis system or service may also use the grouped alarms and a database of knowledge learned from previous anomaly events to generate probable root causes and recommended corrective actions for the anomaly event.

In some embodiments, such a database of knowledge learned from past anomaly events may be referred to herein as a correction of error database. In some embodiments, a correction of error database may store patterns that correspond with anomaly events, such as a pattern of alarms, grouped alarms, etc. In some embodiments, such a pattern may also include other system data, such as changes in latencies between services, service failures, etc. Also, the correction of error database may store determined root causes that have been validated as root causes for such anomaly events that exhibited such patterns. Additionally, the correction of error database may include validated corrective actions that have been validated to resolve the validated root causes. Thus, a correction of error database may enable a root cause detection and diagnosis framework to infer a root cause of an anomaly event based on similarities in patterns between the anomaly event and patterns associated with previous anomaly events, such as alarm patterns. Once a matching pattern is found, a closeness of the match may be used to determine a probability of a root cause associated with the matching alarm pattern being the root cause of the current anomaly event. In some embodiments, a knowledge-based Bayesian network may be implemented using knowledge stored in a correction of error database that has been obtained from previous events or that has been otherwise provided to the correction of error database. In some embodiments, the Bayesian network may use a causal inference model to determine probable root causes. The knowledge-based Bayesian network may take as an input observed alarm patterns/system patterns for a current anomaly event and determine probabilities, using a causal inference model, that the current anomaly event is being caused by one or more known anomaly event causes (e.g. root causes) that are associated with event patterns stored in the correction of error database. In some embodiments, various techniques may be used to select a subset of the possible root causes as a set of most probable root causes. For example, in some embodiments, the top N most probable root causes may be selected, or in some embodiments, root causes with associated probabilities greater than a threshold probability may be selected. The selected most probable root causes and associated corrective actions may then be indicated to a user of the root cause detection and corrective action diagnosis system/service in a solution ticket for the anomaly event.

In some embodiments, a root cause detection and corrective action diagnosis system/service may generate, or otherwise obtain access to, a service graph for an IT system monitored by the root cause detection and diagnosis system/service. The service graph may include a graphical representation of IT operations indicating logical locations of network nodes and service dependencies between services implemented at respective ones of the nodes. For example, a service graph may be built by tracking service calls between services and nodes of an IT system. The source, destination, direction, and/or latencies of the calls may be used to generate and update the service graph. Also, the type of call may be tracked. In some embodiments, call logs, software states, etc. are also used to generate and update the service graph. Thus, the service graph may provide a continuously updated representation of dependencies between services and nodes of an IT system. Also, the service graph may be automatically generated and updated, for example without requiring intervention of an engineer or technician, except in unusual circumstances.

In some embodiments, in order to determine alarm groupings and/or anomaly event patterns to be used by a casual inference model to infer probable root causes, a root cause detection and corrective action diagnosis service may traverse data corresponding to snapshots of the service graph at sequential moments in time during an alarm storm to determine how the alarm/anomaly propagated through the IT system. This may provide insight into how to group the alarms into logical groupings. It may also provide an alarm pattern/alarm propagation pattern that can then be compared against stored alarm patterns/alarm propagation patterns stored in the correction of error database or included in a causal inference model generated from patterns stored in the correction of error database.

Note that the alarm groupings/alarm patterns may correlate alarms in time and space (e.g. logical location and dependency) such that the alarms are organized into groupings that represent how the alarms evolved. In some embodiments, grouped alarms/alarm patterns may be reasoned about as a single meta-alarm. For example, when comparing alarm patterns to known alarm patterns stored in a correction of error database, grouped alarms may be reasoned about in both the anomaly event data and the stored data as single meta-alarms, in some embodiments. In some embodiments, alarms may be reasoned about using both alarm groupings and individual alarms. For example, in some embodiments, initial pattern matching may be performed using grouped alarm patterns. However, amongst two or more equivalently probable root causes, patterns in underlying alarms may be evaluated to determine which of the two or more equivalently probable root causes should be selected as a recommended root cause.

In some embodiments, a correction of error database may be populated with knowledge obtained from past anomaly events and/or may be trained by injecting known error conditions (e.g. anomalies) into a monitored IT system and collecting data for alarm patterns resulting from the known error condition.

In some embodiments, a validation and parsing process may be followed to populate a correction of error database. For example, for anomaly events, IT system data such as alarm patterns, service latencies, service calls, logs, etc. may be collected. Also, a probable root cause may be assigned. However, before being added to the correction of error database, the probable root cause and/or a corrective action to resolve the probable root cause may be validated. For example, in some embodiments a workflow may include one or more engineers validating the root cause and corrective action before adding the data collected for the anomaly event and the corresponding validated root cause and corrective action into the correction of error database. In some embodiments, a root cause detection and corrective action diagnosis system/service may automatically validate probable root causes and corrective actions. For example by automatically implementing the recommended corrective action and observing the monitored IT system to see if implementing the recommended corrective action resolved the symptoms of the anomaly.

In some embodiments, the collected patterns and/or root causes and corrective actions may be tagged to improve searching of the correction of error database. Also, in some embodiments the tags may be further parsed and assigned to categories, wherein the correction of error database is organized as a relational database organized by such categories.

In some embodiments, a root cause detection and corrective action system may be implemented as a service that monitors local IT infrastructure where the system is implemented. Also, in some embodiments, a root cause detection and corrective action system may be implemented as a remote service that monitors IT infrastructure and networks of clients of the service remote from a location where the service is implemented. In some embodiments, a root cause detection and corrective action diagnosis service may be offered as one or a plurality of services offered by a service provider network such as of a cloud-service provider. The provider network may include numerous data centers hosting various resource pools, such as collections of physical and/or virtualized computer servers, storage devices, and networking equipment that are used to implement and distribute infrastructure and services offered by the service provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the service provider network in different embodiments, including computer servers, storage devices, network devices, and the like.

In some embodiments, a service provider network may implement a flexible set of resource reservation, control, and access interfaces for clients. For example, the service provider network may implement a programmatic resource reservation interface (e.g., via a web site or a set of web pages) that allows clients to learn about, select, purchase access to, and/or reserve resources. In one embodiment, resources may be reserved on behalf of clients using a client-accessible service. In one embodiment, the service provider network may execute tasks on behalf of clients using one or more resources of a selected resource pool of the service provider network. In one embodiment, the resource pool may be automatically selected based on the anticipated computational needs of the various tasks. In one embodiment, the resource pool may be selected based on a specific resource request or reservation submitted by the client.

In some embodiments, clients of a root cause detection and corrective action diagnosis system/service may be internal to a service provider network, such as other services or entities associated with a marketplace operated by the service provider network. In one embodiment, clients of the root cause detection and correction action diagnosis service may be external to the service provider network, such as external entities. In some embodiments, an IT system monitored by a root cause detection and corrective action diagnosis service may include some resources implemented using resources of the service provider network and some resources external to the service provider network. For example, a client of a root cause detection and corrective action diagnosis service may use data storage services, compute services, etc. of a service provider network to implement part of the client's IT system and may also use the client's own computing resources or another third-party's computing resources to implement other parts of the client's IT system. In such embodiments, the client may grant access to the root cause detection and corrective action diagnosis system/service to gather and update information necessary to generate and update a service graph for the client's IT system including the resources that are outside of the service provider network.

In some embodiments, a root cause detection and corrective action diagnosis service may be configured to generate network-based service requests and responses according to a Representational State Transfer (REST)-style network-based services architecture, a document- or message-based network-based services architecture, or another suitable network-based services architecture. In at least some embodiments, root cause detection and corrective action diagnosis service may provision, mount, and configure storage volumes implemented at storage services for file systems implemented at computing devices of a service provider network. In some embodiments, a root cause detection and corrective action diagnosis service may communicate via a network. In various embodiments, the network may encompass any suitable combination of networking hardware and protocols necessary to establish network-based communications between services. For example, the network may generally encompass the various telecommunications networks and service providers that collectively implement the Internet. The network may also include private networks such as local area networks (LANs) or wide area networks (WANs) as well as public or private wireless networks. In one embodiment, the network may include the hardware (e.g., modems, routers, switches, load balancers, proxy servers, etc.) and software (e.g., protocol stacks, accounting software, firewall/security software, etc.) necessary to establish a networking link between a client and the Internet as well as between the Internet and a service.

FIG. 1 illustrates an example system for performing root cause detection and diagnosis services for a monitored information technology system, according to some embodiments.

In some embodiments, a root cause detection and diagnosis system, such as root cause detection and diagnosis system 104, receives (or generates) a service graph 106 for an IT system to be monitored. The service graph 106 indicates dependencies between services of the monitored IT system and/or dependencies between nodes of the IT system. In some embodiments, as used herein, a node may refer to a piece of hardware included in a monitored IT system, such as a server, router, switch, etc. Also, as referred to herein, a node may also include a software module or element that provides a service to other software modules/elements. Thus, in some embodiments, multiple software modules/services that correspond to multiple nodes of the monitored IT system may in some cases by implemented using the same physical piece of hardware, such as s server.

The root cause detection and diagnosis system 104 also receives monitored system data, such as log data state data, alarm data, etc. from a monitored system, such as monitored IT system 102.

The root cause detection and diagnosis system 104 determines, based on the received data from the monitored IT system 102 and the service graph 104 for the monitored IT system 102, a solution ticket for an anomaly event being experienced by monitored IT system 102. The solution ticket 128, as an example, includes a listing of currently active anomalies for monitored IT system 102 and corresponding root causes and recommended correction actions. While not shown in FIG. 1, in some embodiments, root cause detection and diagnosis system 104 may determine more than one probable root cause for a given anomaly. For example, for anomaly "A" the root cause detection and corrective action diagnosis system 104 may determine multiple causes and related recommended corrective actions. In some embodiments, the multiple probable root causes for a given anomaly event/condition may be ranked based on probability. Also, in some embodiments, only the top N (e.g. 3, 5, etc.) most probable root causes may be included in a solution ticket 128. Alternatively, or additionally, in some embodiments only root causes with a determined probability greater than a threshold probability (e.g. 75% probable, 90% probable, etc.) may be included in a solution ticket 128.

In some embodiments, a root cause detection and diagnosis system 104 may be triggered to generate a solution ticket 128 in response to one or more triggers, such as a total number of active alarms exceeding an alarm threshold. For example, the number of active alarms exceeding the alarm threshold may indicate an alarm storm event is occurring in monitored IT system 102. Also, in some embodiments, a user of the root cause detection and diagnosis system 104, may trigger a solution ticket 128 to be generated, for example in response to initiating a health check. In such situations, the root cause detection and diagnosis system 104 may determine anomalies occurring in the monitored IT system 102. In some embodiments, alarm sensitivities, or threshold values, such as latencies between services, may be more stringent during a health check than would be the case for a general alarm. Thus a health check may indicate underlying issues that have not developed to a level at which regular system alarms are triggered.

FIG. 1 also shows a more detailed view of an example embodiment of root cause detection and diagnosis system 104, which may be an IT operations monitoring system for monitored IT system 102. In some embodiments, root cause detection and diagnosis system 104 includes service graph 108 and/or an interface to access a service graph 108 that is maintained by another service that monitors IT system 102. As discussed above, the service graph 108 may be generated by tracking calls between services and nodes of the monitored IT system 102 to determine dependencies between the services and nodes. Also, in some embodiments, the service graph 108 may indicate latencies between the nodes or services of the monitored IT system 102 and/or states of the services or nodes of the monitored IT system 102, such as failed states, in-service states, etc.

In some embodiments, root cause detection and diagnosis system 104 may include an interface 112 to receive architecture information for monitored IT system 102, such as a network layout and information about nodes included in the monitored IT system 102. In some embodiments, the system architecture may provide a roadmap for use in generating a service graph, by indicating nodes and services of the monitored IT system 102, wherein this information is used to track calls between the nodes and services and to assign information gathered from tracking the calls to correct corresponding logical locations in the service graph. In some embodiments, operational data about the monitored IT system 102 may be received via interface 114 and may be provided to the service graph 108, for example to continuously update (or periodically update) the service graph 108.

Also, root cause detection and diagnosis system 104 includes, or has access to, correction of error database 110. The correction of error database 110 includes validated root causes for anomaly events and patterns associated with the anomaly events. Also, in some embodiments correction of error database 110 includes validated corrective actions to be taken to resolve the root causes for the anomaly events. In some embodiments, the correction of error database 110 may be updated on an on-going basis as new information is learned from newly occurring anomaly events. In some embodiments, root causes associated with anomaly event patterns may be validated before being added to correction of error database 110. Also corrective actions to be taken for the validated root causes, may themselves also be validated to resolve the root cause, and this validation may also take place before the associated corrective actions are added to the correction of error database 110 for use in solution tickets. Note that in some embodiments, yet-to-be validated root causes and yet-to-be validated corrective actions may be stored in correction of error database 110, but may not be available to be used in a causal inference model or to be supplied to a customer in a solution ticket, until validated.

In some embodiments, an alarm grouping engine 118 may receive current data for a monitored system, such as monitored IT system 102, via interface 114. The alarm grouping engine 118 may also access service graph 108 and/or event pattern information stored in correction of error database 110 to group alarms occurring during an alarm storm event into related alarm groups, such that the alarms can be more easily reasoned about as a larger meta-alarm, as opposed to a large number of individual alarms. In some embodiments, in order to group alarms, alarm grouping engine 118 may traverse data of service graph 108 corresponding to multiple moments in time to determine how alarms propagated through the monitored IT system 102 taking into account service dependencies and node locations relative to other nodes.

In some embodiments, causal inference engine 122 receives grouped alarm information from alarm grouping engine 118 and also receives/accesses service graph 108 and receives event information and associated root causes from correction of error database 110. Using this received information, the causal inference engine 122 generates a causal analysis model to determine a set of most probable inferred root causes for a given anomaly event. In some embodiments, the causal inference engine 122 may generate associated probabilities for each of the inferred probable root causes, wherein the probabilities indicate how probable it is that a given root cause is the cause of the observed event pattern. Depending on complexity, in some embodiments, causal inference engine 122 may directly receive alarm information via interface 114 without the alarm information being grouped by alarm grouping engine 118.

Causal interface engine 122 generates a set of probable root causes 124 with associated probabilities. Solution ticket generator 126 then selects the most probable root causes according to one or more criteria, e.g. the N most probable root causes, or root causes with a probability greater than a threshold, wherein the selected root causes are included in solution ticket 128 that is provided to a customer/client of the root cause detection and diagnosis system 104, via interface 116. In some embodiments, one or more solutions may also be added to the solution ticket, such as associated corrective actions to be taken for the selected root causes, a software patch to be installed to resolve the selected root causes, a procedure to be performed to trouble shoot the selected root causes, etc. In some embodiments, the solution store may be a part of the correction of error database 110 and may include validated corrective actions.

In some embodiments, causal inference engine 122 may generate a knowledge-based Bayesian network using knowledge stored in correction of error database 110 that has been obtained from previous events or that has been otherwise provided to the correction of error database 110. In some embodiments, the Bayesian network may use a causal inference model to determine probable root causes. The knowledge-based Bayesian network may take as an input observed alarm patterns/system patterns for a current anomaly event, such as from service graph 108 and/or in data received via interface 114 and determine probabilities, using the causal inference model, that a given anomaly event is being caused by one or more known anomaly event causes (e.g. root causes) that are associated with event patterns stored in the correction of error database 110.

Figure 2A:
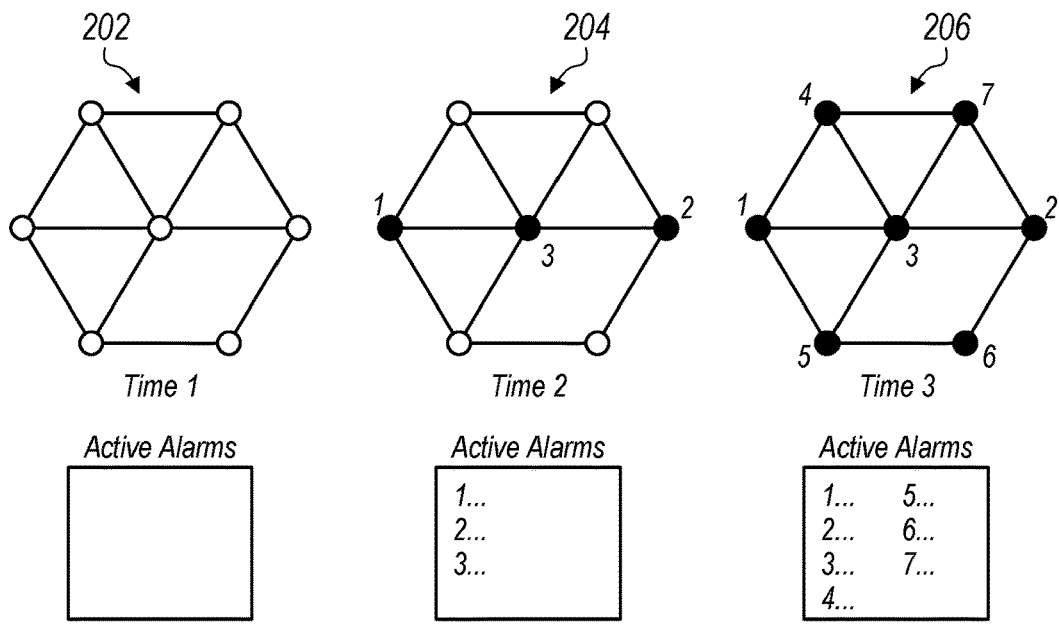
FIG. 2A illustrates nodes in a portion of a monitored information technology system and changes in alarm state over time due to an anomaly event, according to some embodiments.

FIG. 2A illustrates nodes in a portion of a monitored information technology system and changes in alarm state over time due to an anomaly event, according to some embodiments.

In some embodiments, a single issue or set of issues may quickly propagate through an IT system to cause an alarm storm. For example at time 1 (202) there may not be any active alarms for the nodes or services of a portion of a monitored IT system as shown in FIG. 2A. Then at a next moment in time, e.g. at time 2 (204), an anomaly event may take place at node 1 and another anomaly event may take place at node 2. These two anomaly events may further cause an issue at node 3, even though there is no underlying problem at node 3. As can be seen at time 2, a number of active alarms may have jumped from zero to three active alarms (e.g. active alarms for nodes 1, 2, and 3). Then at a subsequent next moment in time, e.g. at time 3 (206), issues affecting nodes 1, 2, and 3 may have propagated to nodes 4, 5, 6, and 7. Also at time 3, alarms may be active for each of nodes 1, 2, 3, 4, 5, 6, and 7. As can be seen, by time 3, the alarm storm has made it difficult and/or impossible to discern the root cause based on the active alarms. For example, in the situation shown in FIG. 2A, when time 3 is reached all of the alarms are active.

Figure 3:
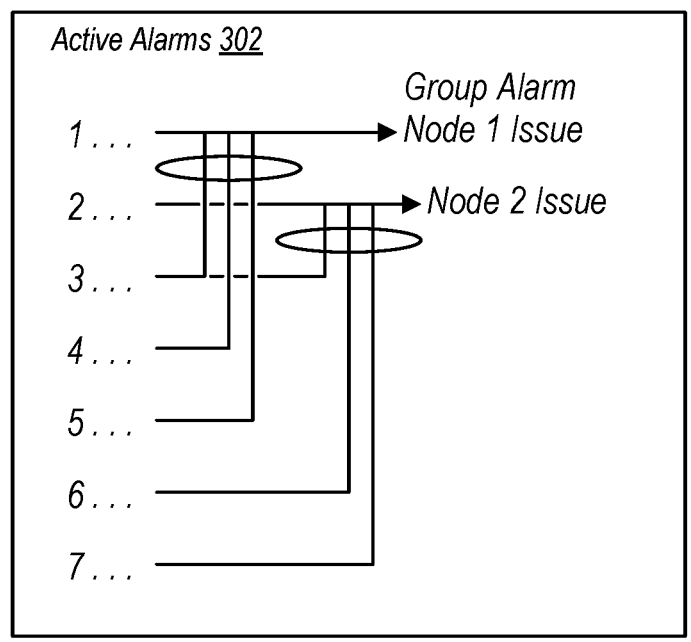
FIG. 3 illustrates an example grouping of alarms during an alarm storm event, according to some embodiments.

However, as shown in FIG. 3, the active alarms may be grouped, for example, by alarm grouping engine 118 into a first grouped alarm relating to node 1 issues and second grouped alarm relating to node 2 issues. Thus, active alarms 302 that have been grouped give more insight into the underlying anomalies at nodes 1 and 2 than can be discerned from the situation at time 3 wherein all the alarms for nodes 1-7 are active. For example, FIG. 3 illustrates an example grouping of alarms during an alarm storm event, according to some embodiments.

Figure 2B:
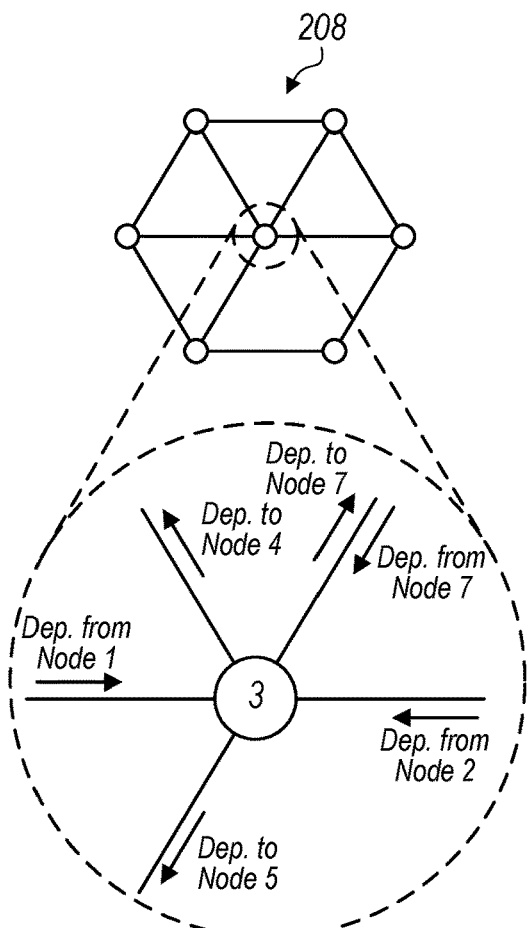
FIG. 2B illustrates a portion of a service graph for a node of the information technology system, wherein the service graph indicates dependencies between services and nodes of the information technology system, according to some embodiments.

FIG. 2B illustrates a portion of a service graph for a node of the information technology system, wherein the service graph indicates dependencies between services and nodes of the information technology system, according to some embodiments.

As can be seen in FIG. 2B, service graph 208 indicates dependencies between the nodes. Thus, for node 3, it can be determined that it depends on nodes 1 and 2. Thus, the issues at nodes 1 and 2 affected node 3, and likely caused node 3 to go into an alarm state. Also, nodes 4 and 5 depend on node 3. Thus, the conditions causing node 3 to go into the alarm state (that were propagated from nodes 1 and 2) likely then caused nodes 4 and 5 to go into alarm states at time 3. As can be seen, an alarm grouping engine, such as alarm grouping engine 118, can traverse data of the service graph corresponding to different moments in time and identify the spread of active alarms, high latencies, off-line nodes or services, or other anomaly event symptoms to trace back an origin of the anomaly event. Then the alarm grouping engine 118 can group active alarms that were caused by the propagating issues caused by the origin of the anomaly event to be grouped together as a grouped meta-alarm.

Also, causal inference engine 122 can determine propagation patterns of anomaly event symptoms using a service graph, such as serve graph 208. The causal inference engine 122 can then use the determined propagation patterns and stored propagation patterns stored in a correction of error database 110 as inputs to a causal inference model to determine probable root causes of the anomaly event.

Figure 4:
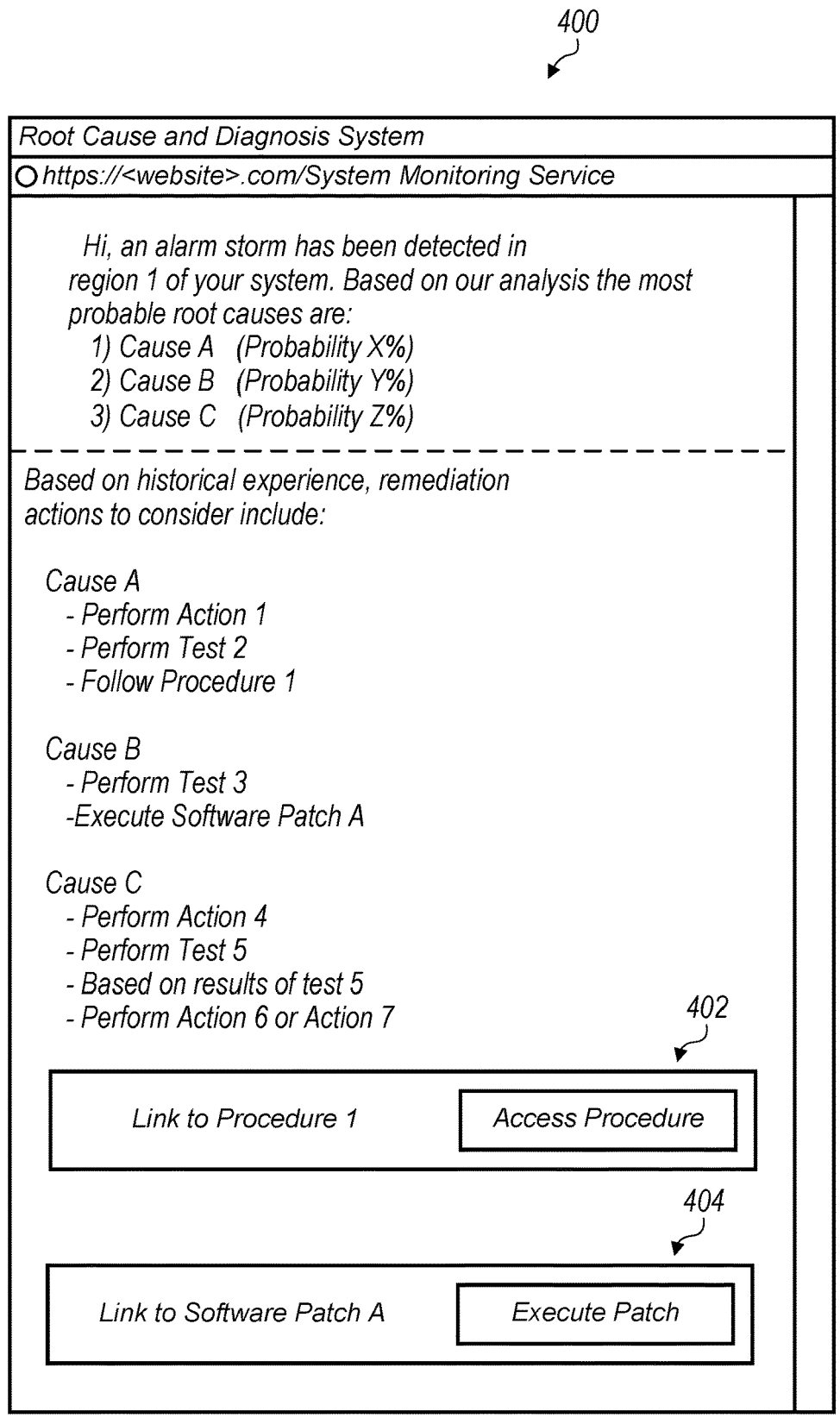
FIG. 4 illustrates an example solution ticket that may be provided by a root cause detection and diagnosis service, according to some embodiments.

FIG. 4 illustrates an example solution ticket that may be provided by a root cause detection and diagnosis service, according to some embodiments.

As shown in FIG. 4, a solution ticket 400 may include a list of probable root causes for an anomaly event and associated probabilities. Also, a solution ticket 400 may include recommended corrective actions for the probable root causes, and may optionally include tools for troubleshooting the probable root causes, such as a link 402 to a procedure for troubleshooting a given root cause, or a link 404 to a software patch for resolving a given root cause. In some embodiments, solution ticket 128 illustrated in FIG. 1 may include similar components as solution ticket 400.

Figure 5:
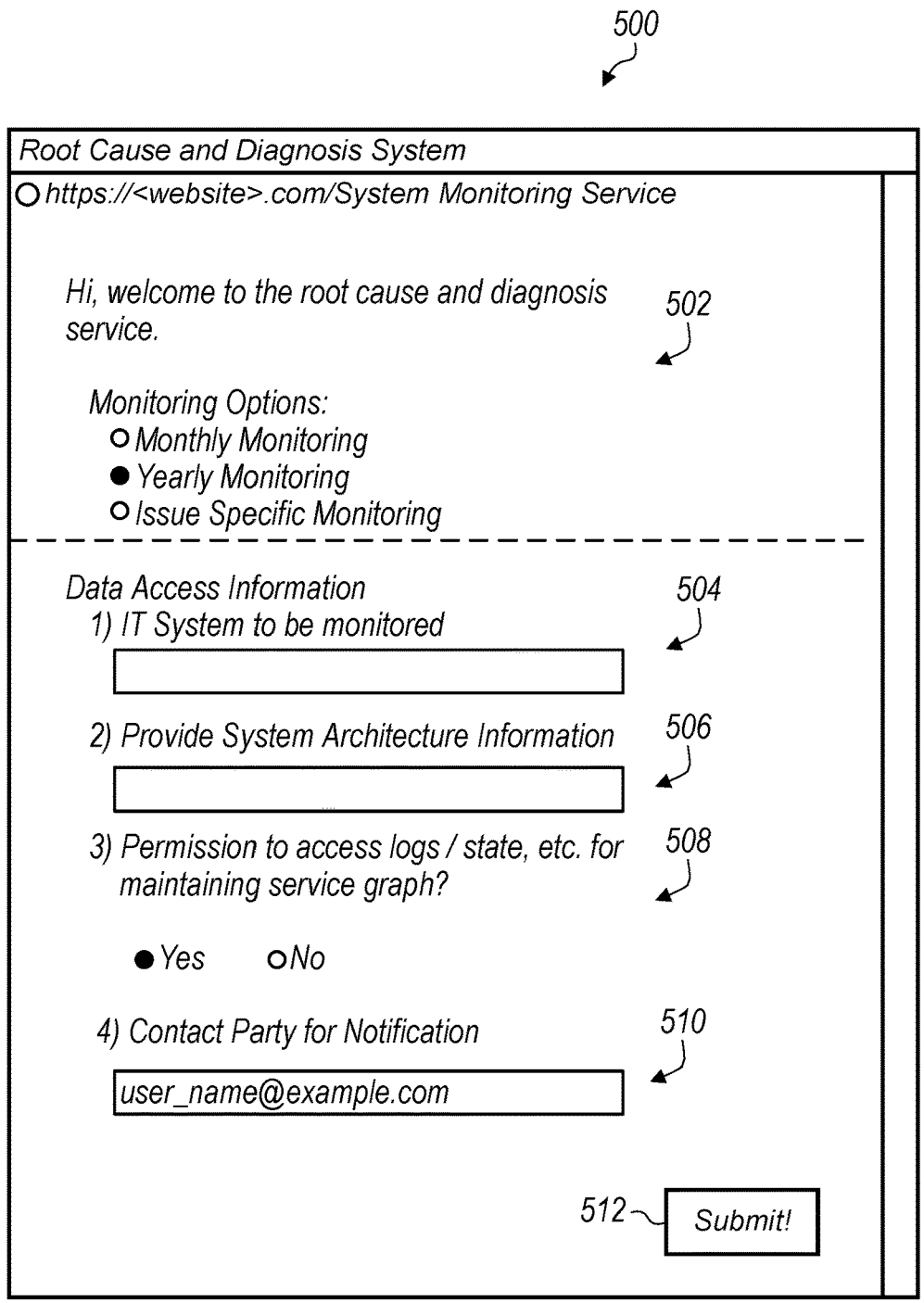
FIG. 5 illustrates an example user interface for enrolling a customer information technology system for monitoring by a root cause detection and diagnosis service, according to some embodiments.

FIG. 5 illustrates an example user interface for enrolling a customer information technology system for monitoring by a root cause detection and diagnosis service, according to some embodiments.

As discussed above, in some embodiments a system may offer root cause detection and corrective action diagnosis service to clients, wherein the system monitors the client's IT infrastructure. In some embodiments the client's IT infrastructure may be implemented in part using cloud-based services of a service provider network that also provides the root cause detection and corrective action diagnosis services. Also, in some embodiments, a monitored system may be external to a service provider network that provides the root cause detection and corrective action diagnosis services. Also, in some embodiments, a monitored system may include a mixture of resources, wherein some are included in the service provider network and some are external, such as being at a client's own data center.

In some embodiments, a service request 500 includes an option 502 to request monitoring of a client IT system for a specified monitoring period. Also, service request 500 may include an entry space 504 to specify a client IT system to be monitored and a space 506 to provide system architecture information for the client system to be monitored, such as may be necessary to generate a service graph. Also, service request 500 may include a selection option 508 to grant access to IT system data, for example as may be needed to continuously update a service graph. Additionally, service request 500 may include a space 510 for providing contact information for the client, such as an email address for a person that will be receiving solution tickets generated by the root cause detection and corrective action diagnosis service. Also, the service request 500 may include a button 512 to submit the request.

Figure 6:
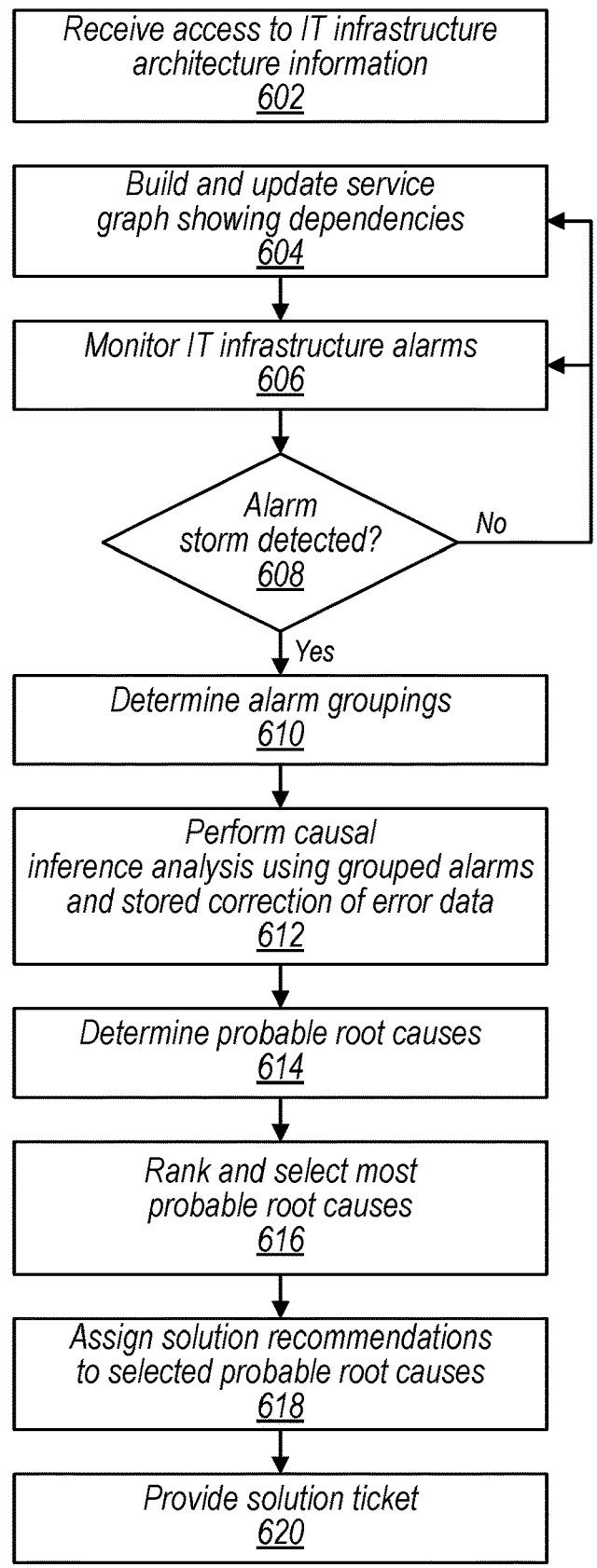
FIG. 6 is a flow chart illustrating a method of monitoring an information technology system using a root cause detection and diagnosis service, according to some embodiments.

FIG. 6 is a flow chart illustrating a method of monitoring an information technology system using a root cause detection and diagnosis service, according to some embodiments.

In some embodiments, a root cause detection and diagnosis system receives, at 602, access to an IT infrastructure that is to be monitored by the root cause detection and diagnosis system. For example a client may have submitted architecture information in a service request 400 as described in FIG. 4. Also, in some embodiments, the root cause detection and diagnosis system may be part of a service provider network and may be monitoring resources of the service provider network that have been allocated to a client of the root cause detection and diagnosis system. In such embodiments, the root cause detection and diagnosis system may receive access to the infrastructure architecture information from the service provider (without the client necessarily having to provide the infrastructure architecture information). Also, at 602, access may be granted to obtain operational information for the IT infrastructure to be monitored, such as call logs between nodes and services of the IT infrastructure, etc.

At 604, the root cause detection and diagnosis system builds and updates a service graph for the IT infrastructure to be monitored, wherein the service graph indicates dependencies between nodes and services of the monitored IT infrastructure. In some embodiments, the root cause detection and diagnosis system may track calls, such as a call source, a call destination, a call type, a call latency, etc. to build a service graph. In some embodiments, wherein access is available, the service graph may be continuously or periodically updated.

At 606, the root cause detection and diagnosis system monitors the IT system for active alarms and/or other anomaly conditions. If at 608, an alarm storm is detected, a root cause for the alarm storm may be determined, otherwise the root cause detection and diagnosis system may continue to monitor the IT system.

At 608, in response to detecting a number of active alarms exceeds a threshold number of active alarms indicating an alarm storm, the root cause detection and diagnosis system proceeds to group, at 610, the active alarms as described herein for the alarm grouping engine 118.

At 612, the root cause detection and diagnosis system performs a causal inference analysis using a causal inference model to determine probable root causes of the alarm storm. This may be performed as described herein using the correction of error data maintained for the IT system being monitored and a causal inference engine 122.

At 614, a set of probable root causes are determined based on the causal inference analysis performed at 612. At 616, the determined probable root causes are ranked and a sub-set of the probable root causes are selected as root causes to be presented to a client of the root cause detection and diagnosis system.

At 618, solution recommendations (such as recommended corrective actions) are assigned to the selected root causes. The correction of error database may include validated solutions for the selected root causes, and the validated solutions may be assigned to be included in a solution ticket to be presented to the client, wherein the validated solutions are included in the solution ticket with the respective root causes to which they correspond.

At 620, the solution ticket is provided to the client, wherein the solution ticket includes most probable root causes for the anomaly causing the alarm storm and recommended corrective actions to be taken to resolve the anomaly causing the alarm storm.

Figure 7:
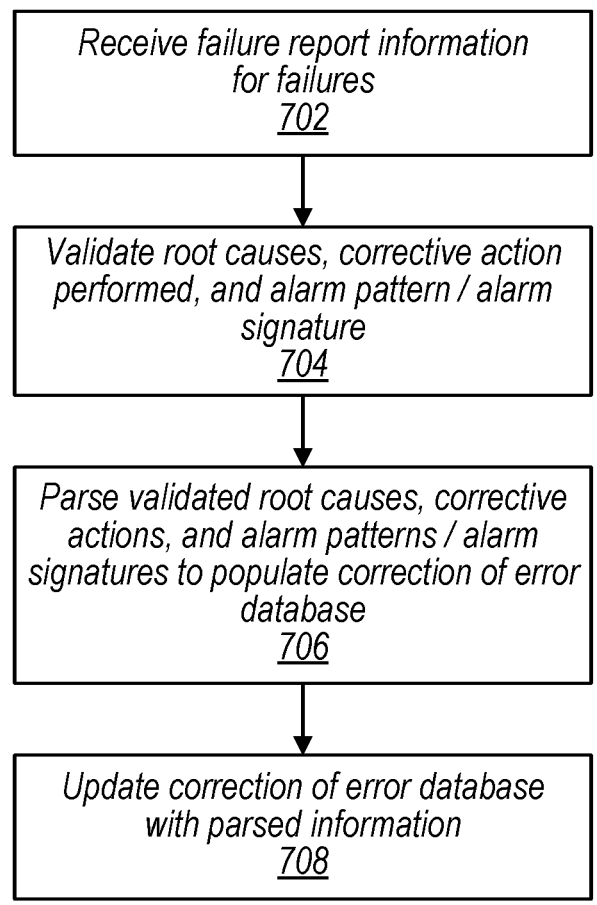
FIG. 7 is a flowchart illustrating a method for updating a correction of error database used by a root cause detection and diagnosis service, according to some embodiments.

FIG. 7 is a flowchart illustrating a method for updating a correction of error database used by a root cause detection and diagnosis service, according to some embodiments.

In some embodiments, a validation process may be used to validate information to be added to a correction of error database, such as correction of error database 110.

In some embodiments, at 702 failure report/anomaly event report information may be received for validation. The failure report/anomaly event information may include alarm patterns, service graph latencies, dependencies, states, etc. that were automatically collected at multiple moments in time during a failure/anomaly event.

At 704, root causes generated for the failure/anomaly event by a root cause detection and diagnosis system may be validated as correct root causes for the failure/anomaly event. For example, an engineer or technician may submit a validation that resolving the root cause supplied by the root cause detection and diagnosis system resolved the failure/anomaly. Also, the proposed corrective actions may be validated as resolving the failure/anomaly.

At 706, tags may be assigned to the validated root cause and/or validated corrective actions. Also, the tags, the alarm patterns, system data patterns, etc. may be parsed and assigned to different categories maintained by the correction of error database. For example, in some embodiments, the correction of error database may be a relational database.

At 708, the parsed information may be added to the correction of error database to update the correction of error database with information for an additional anomaly event that has been resolved.

Figure 8:
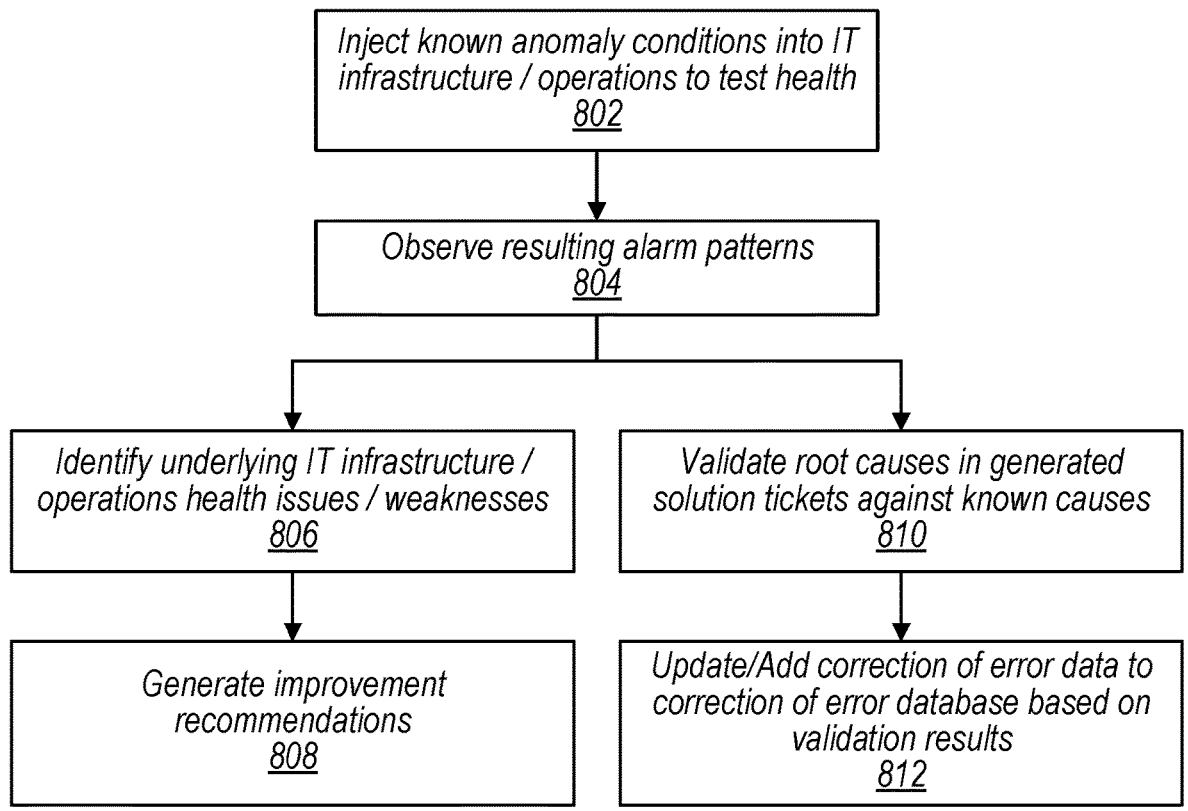
FIG. 8 is a flowchart illustrating a method of injecting known failure symptoms into an information technology system to perform a health check and/or populate a correction of error database used by a root cause detection and diagnosis service, according to some embodiments.

FIG. 8 is a flowchart illustrating a method of injecting known failure symptoms into an information technology system to perform a health check and/or populate a correction of error database used by a root cause detection and diagnosis service, according to some embodiments.

At 802, known anomaly conditions are injected into an IT infrastructure to test health and/or to accelerate populating a correction of error database for the IT infrastructure. Because the anomaly conditions are known, alarm patterns, etc. caused by the known anomaly conditions can be associated with the known anomaly conditions as a matching pattern to be stored in the correction of error database. In this way, future occurrences of the anomaly condition can be properly diagnosed based on exhibiting the matching pattern of symptoms.

At 804, the IT infrastructure is observed to identify resulting patterns caused by the injected known anomaly conditions.

At 806, underling issues are identified based on the application of the known anomaly conditions. For example, if a service is designed to have two redundant input sources, a known anomaly that takes out of service one of the input services may reveal that a second one of the input sources has been unavailable for a period of time or may reveal that the other input source has a high latency. For example, under normal conditions the deficient backup input source may not materialize as an issue, however the health check may reveal this underlying weakness in the system being monitored.

At 808, the root cause detection and diagnosis service generates improvement recommendations based on the results of the health check, such as correcting an issue with the backup input source.

At 810, as part of populating the correction of error database, the root cause detection and diagnosis service may validate that generated root causes for the injected anomaly condition match the known cause of the anomaly condition.

Also, at 812, the root cause detection and diagnosis service may update the correction of error database with patterns observed for the known anomaly conditions.

Illustrative Computer System

Figure 9:
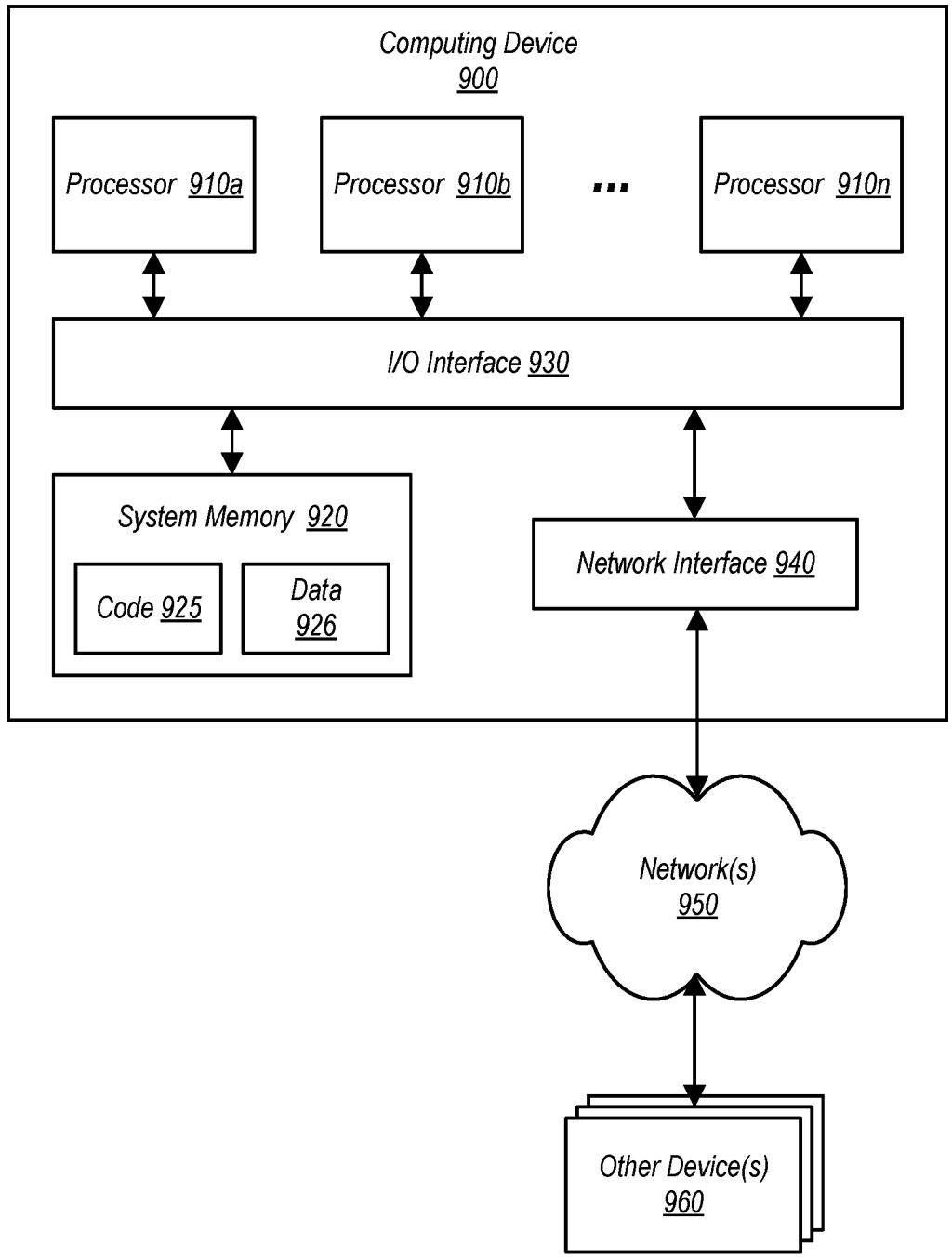
FIG. 9 illustrates an example computing device that may be used in some embodiments.

In at least some embodiments, a computer system that implements a portion or all of one or more of the technologies described herein may include a computer system that includes or is configured to access one or more computer-readable media. FIG. 9 illustrates such a computing device 900. In the illustrated embodiment, computing device 900 includes one or more processors 910A-910N coupled to a system memory 920 via an input/output (I/O) interface 930. Computing device 900 further includes a network interface 940 coupled to I/O interface 930.

In various embodiments, computing device 900 may be a uniprocessor system including one processor or a multiprocessor system including several processors 910A-910N (e.g., two, four, eight, or another suitable number). Processors 910A-910N may include any suitable processors capable of executing instructions. For example, in various embodiments, processors 910A-910N may be processors implementing any of a variety of instruction set architectures (ISAs), such as the x86, PowerPC, SPARC, or MIPS ISAs, or any other suitable ISA. In multiprocessor systems, each of processors 910A-910N may commonly, but not necessarily, implement the same ISA.

System memory 920 may be configured to store program instructions and data accessible by processor(s) 910A-910N. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code (i.e., program instructions) 925 and data 926.

In one embodiment, I/O interface 930 may be configured to coordinate I/O traffic between processors 910A-910N, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processors 910A-910N.

Network interface 940 may be configured to allow data to be exchanged between computing device 900 and other devices 960 attached to a network or networks 950. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 900 via I/O interface 930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 900 as system memory 920 or another type of memory. Further, a computer-readable medium may include transmission media or signals such as electrical, electromagnetic, or digital signals, conveyed via a communication medium such as a network and/or a wireless link, such as may be implemented via network interface 940. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An information technology (IT) operations monitoring system, comprising:
    one or more computing devices configured to:
        generate, or receive access to, a service graph for the IT operations, wherein the service graph comprises:
            a graphical representation of the IT operations indicating logical locations of network nodes of the IT operations relative to other network nodes of the IT operations; and
            service dependencies between services implemented at respective ones of the nodes of the IT operations;
        determine whether a quantity of active alarms for the IT operations exceeds one or more alarm thresholds; and
        provide an indication of one or more root cause conditions causing the active alarms in response to determining the number of active alarms exceeds the one or more alarm thresholds,
    wherein to provide the indication of the one or more root cause conditions, the one or more computing devices are further configured to:
        traverse service graph data corresponding to a plurality of moments in time during which respective ones of the active alarms were triggered;
        identify one or more alarm groupings for the active alarms based on logical locations of nodes associated with the active alarms as indicated in the service graph and based on service dependencies of services associated with the active alarms as indicated in the service graph;
        generate one or more probable root cause inferences based on applying the identified one or more alarm groupings to a causal analysis model, wherein the causal analysis model comprises alarm grouping patterns and associated probable root causes; and
        select, from the generated one or more probable root cause inferences, respective ones of the one or more probable root cause inferences that have associated probabilities greater than a probability threshold, wherein the selected one or more probable root cause inferences are assigned as the one or more root cause conditions causing the active alarms.

2. The IT operations monitoring system of claim 1, further comprising:
    a correction of error database, wherein the causal analysis model is generated using data stored in the correction of error database, and
    wherein the one or more computing devices are configured to:

update the correction of error database with data collected for events causing a given quantity of active alarms for the IT operations to exceed the one or more alarm thresholds.

3. The IT operations monitoring system of claim 2, wherein to update the correction of error database, the one or more computing devices are configured to:
   automatically collect data for the events with active alarms exceeding the one or more alarm thresholds;
   automatically associate one or more assigned root cause conditions, assigned for the events, with the collected data; and
   in response to receiving a validation indication for the assigned one or more root cause conditions, add the assigned one or more root cause conditions and associated collected data to the correction of error database.

4. The IT operations monitoring system of claim 2, wherein to populate the correction of error database, the one or more computing devices are configured to:
   inject one or more known error conditions into the IT operations;
   automatically collect data related to one or more events caused by the injection of the one or more known error conditions; and
   add the collected data for the one or more events and the known error conditions to the correction of error database, wherein the known error conditions are associated with the collected data.

5. The IT operations monitoring system of claim 1, wherein the one or more computing devices are further configured to:
   provide an event ticket for an event causing the active alarms, wherein the event ticket comprises:
      the indication of the one or more root cause conditions causing the active alarms; and
      one or more recommended corrective actions to be taken to resolve the one or more root cause conditions causing the active alarms.

6. A method, comprising:
   determining a quantity of active alarms for a monitored system exceeds one or more alarm thresholds;
   traversing service graph data for the monitored system corresponding to a plurality of moments in time to identify one or more alarm patterns, wherein the service graph comprises:
      service dependencies between services implemented at respective nodes of the monitored system; and
   determining one or more root cause conditions causing the active alarms based on applying the identified one or more alarm patterns to a causal analysis model, wherein the causal analysis model comprises alarm patterns and associated root causes.

7. The method of claim 6, wherein the service graph further comprises:
   logical locations of the nodes of the monitored system relative to other ones of the nodes of the monitored system, and
   wherein the method further comprises:
      identifying one or more alarm groupings based on the logical locations of nodes associated with the active alarms and based on service dependencies of services associated with the active alarms,
      wherein the one or more alarm patterns comprise the identified alarm groupings.

8. The method of claim 6, further comprising:
   generating the service graph, wherein generating the service graph comprises:
      determining a graphical representation for logical locations of the nodes of the monitored system; and
      determining dependencies for services implemented via the respective ones of the nodes of the monitored system that are dependent on other services implemented at other respective ones of the nodes of the monitored system.

9. The method of claim 6, further comprising:
   providing a user interface to a customer of a monitoring service that performs said determining the quantity of active alarms exceeds the one or more alarm thresholds, said traversing the service graph data, and said determining the one or more root causes;
   receiving, via the user interface, authorization to access operational data for the nodes of the monitored system, wherein the monitored system is a system of the customer of the monitoring service; and
   providing the determined one or more root cause conditions to the customer.

10. The method of claim 6, further comprising:
    providing an event ticket for an event causing the active alarms, wherein the event ticket comprises:
       the determined one or more root cause conditions; and
       one or more recommended corrective actions to be taken to resolve the one or more root cause conditions causing the active alarms.

11. The method of claim 10, wherein the determined one or more root cause conditions and the one or more corrective actions are determined using information stored in a correction of error database,
    wherein the method further comprises:
       automatically collecting data for other events with a quantity of active alarms exceeding the one or more alarm thresholds;
       automatically associating one or more assigned root cause conditions for the other events with the collected data; and
       in response to receiving a validation indication for the assigned one or more root cause conditions, adding the assigned one or more root cause conditions and associated collected data for the other events to the correction of error database.

12. The method of claim 11, further comprising:
    determining, for the other events, one or more recommended corrective actions to be taken to resolve the one or more assigned root cause conditions;
    assigning tags to the one or more corrective actions determined for the other events, wherein the tags associate the one or more corrective actions with the one or more root cause conditions causing the other events; and
    parsing the tags such that information included in the tags is assigned to root cause condition categories of the correction of error database; and
    adding the information from the parsed tags to the correction of error database as corrective actions for events with alarm patterns similar to alarm patterns of the other events.

13. One or more non-transitory computer-readable media storing program instructions, that when executed on or across one or more processors, cause the one or more processors to:
    determine a quantity of active alarms for a monitored system exceeds one or more alarm thresholds;

traverse service graph data for the monitored system corresponding to a plurality of moments in time to identify one or more alarm patterns, wherein the service graph comprises:
service dependencies between services implemented at respective nodes of the monitored system; and
determine one or more root cause conditions causing the active alarms based on applying the identified one or more alarm patterns to a causal analysis model, wherein the causal analysis model comprises alarm patterns and associated root causes.

14. The one or more non-transitory computer-readable media of claim 13, wherein the program instructions further cause the one or more processors to:
implement an application programmatic interface (API) for receiving operational data for nodes of the monitored system, wherein the monitored system is a system of a customer of a monitoring service implemented using the program instructions stored by the one or more non-transitory computer-readable media.

15. The one or more non-transitory computer-readable media of claim 13, wherein the program instructions further cause the one or more processors to:
receive, via an application programmatic interface (API), configuration data for nodes of the monitored system operated by an entity other than an entity that performs the monitoring for the monitored system; and
update the service graph to reflect changes in dependencies between the services of the monitored system based on the configuration data received via the API.

16. The one or more non-transitory computer-readable media of claim 13, wherein the service graph further comprises:
logical locations of the nodes of the monitored system relative to other ones of the nodes of the monitored system, and
wherein the program instructions further cause the one or more processors to:
identify one or more alarm groupings based on locations of nodes associated with the active alarms and based on service dependencies of services associated with the active alarms,
wherein the one or more alarm patterns comprise the identified alarm groupings.

17. The one or more non-transitory computer-readable media of claim 13, wherein the causal analysis model is implemented using a Bayesian network.

18. The one or more non-transitory computer-readable media of claim 13, wherein the program instructions further cause the one or more processors to:
update the service graph to reflect changes in dependencies between the services of the monitored system for nodes of the monitored system operated by an entity that performs monitoring for the monitored system.

19. The one or more non-transitory computer-readable media of claim 13, wherein the service graph further comprises:
logical locations of the nodes of the monitored system relative to other ones of the nodes of the monitored system, and
wherein the one or more alarm patterns applied to the causal analysis model comprise patterns based on:
node logical location proximity to logical locations of other nodes of the monitored system;
service dependencies between services of the monitored system; and
changes in conditions at the nodes or changes in conditions related to the services over a plurality of moments in time.

20. The one or more non-transitory computer-readable media of claim 13, wherein the program instructions further cause the one or more processors to:
provide a user interface to a customer of a service provider network, wherein the user interface comprises an option to select root cause monitoring of customer services implemented for the customer using resource of the service provider network; and
perform monitoring for one or more selected customer services implemented for the customer using the resources of the provider network, wherein performing the monitoring comprises:
said determine a quantity of active alarms for the customer service exceeds the one or more alarm thresholds;
said traverse the service graph data for the customer service corresponding to the plurality of moments in time to identify the one or more alarm patterns; and
said determine the one or more root cause conditions causing the active alarms for the customer service based on applying the identified one or more alarm patterns to the causal analysis model.

\* \* \* \* \*